(12) United States Patent
Anderson et al.

(10) Patent No.: US 9,411,105 B2
(45) Date of Patent: Aug. 9, 2016

(54) MULTI-AXIS GRADED-INDEX PHOTONIC COUPLING

(71) Applicant: Cisco Technology, Inc., San Jose, CA (US)

(72) Inventors: Sean Anderson, Macungie, PA (US); Weizhuo Li, Berkeley Heights, NJ (US); Vipulkumar Patel, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/330,487

(22) Filed: Jul. 14, 2014

(65) Prior Publication Data

US 2016/0011375 A1  Jan. 14, 2016

(51) Int. Cl.
*G02B 6/32* (2006.01)
*G02B 3/00* (2006.01)
*G02B 6/124* (2006.01)
*G02B 6/42* (2006.01)
*G02B 6/12* (2006.01)

(52) U.S. Cl.
CPC .............. *G02B 6/32* (2013.01); *G02B 3/0087* (2013.01); *G02B 6/124* (2013.01); *G02B 6/4206* (2013.01); *G02B 2006/12176* (2013.01); *G02B 2006/12178* (2013.01); *G02B 2006/12195* (2013.01)

(58) Field of Classification Search
CPC ........................................................ G02B 6/32
USPC ............................................................ 385/33
See application file for complete search history.

(56) References Cited

U.S. PATENT DOCUMENTS

| | | | |
|---|---|---|---|
| 4,737,015 A | 4/1988 | Ishida et al. | |
| 4,762,403 A * | 8/1988 | Hattori | G02B 13/06 359/654 |
| 4,880,298 A * | 11/1989 | Takada | G02B 21/02 359/654 |
| 4,900,138 A * | 2/1990 | Atkinson, III | G02B 3/06 359/654 |
| 4,907,864 A * | 3/1990 | Hagerty | C03B 19/09 359/653 |
| 5,044,737 A * | 9/1991 | Blankenbecler | C03B 23/22 359/653 |
| 5,236,486 A * | 8/1993 | Blankenbecler | B29D 11/00355 65/102 |
| 5,239,413 A * | 8/1993 | Kawano | G02B 21/02 359/652 |
| 5,579,168 A * | 11/1996 | Aoki | G02B 15/173 359/653 |
| 5,871,266 A * | 2/1999 | Negishi | G02B 27/126 348/E9.027 |
| 5,995,295 A * | 11/1999 | Nagaoka | G02B 3/0087 359/654 |
| 5,999,327 A * | 12/1999 | Nagaoka | G02B 3/0087 359/654 |
| 6,016,224 A * | 1/2000 | Namiki | H04N 5/7416 348/E5.139 |
| 6,092,728 A * | 7/2000 | Li | G06K 7/10811 235/454 |
| 6,301,043 B1 * | 10/2001 | Lei | G02B 23/2407 359/435 |
| 6,789,931 B2 * | 9/2004 | Pinho | H04N 9/3141 348/E5.143 |

(Continued)

OTHER PUBLICATIONS

International Search Report and Written Opinion, from PCT/US2015/033891, Sep. 21, 2015, WO.

(Continued)

*Primary Examiner* — Kaveh C Kianni
(74) *Attorney, Agent, or Firm* — Lempia Summerfield Katz LLC (57) ABSTRACT

An optical coupling may involve orienting a waveguide and a lens such that light rays are focused on a surface. The lens may involve the use of a material having a variable refractive index to focus rays of light along first axis and a curved surface to focus the rays of light along a second axis.

15 Claims, 6 Drawing Sheets

(56) References Cited

U.S. PATENT DOCUMENTS

| | | | | |
|---|---|---|---|---|
| 6,839,483 B2* | 1/2005 | Reed | | A61B 5/0084 385/28 |
| 6,952,513 B2* | 10/2005 | Murphy | | G02B 6/262 385/31 |
| 7,031,567 B2* | 4/2006 | Grinderslev | | G02B 6/32 385/34 |
| 8,259,155 B2* | 9/2012 | Marathe | | H04N 7/147 348/14.01 |
| 2003/0035620 A1* | 2/2003 | Manolatou | | G02B 6/1228 385/33 |
| 2003/0165292 A1* | 9/2003 | Bhagavatula | | G02B 6/2552 385/33 |
| 2003/0210341 A1* | 11/2003 | Isono | | G02B 9/04 348/335 |
| 2004/0080632 A1* | 4/2004 | Iwasawa | | G02B 13/0045 348/240.3 |
| 2004/0233302 A1* | 11/2004 | Kojima | | G02B 15/173 348/240.3 |
| 2004/0246362 A1* | 12/2004 | Konno | | G02B 15/177 348/335 |
| 2005/0231818 A1* | 10/2005 | Matsusaka | | G02B 13/0035 359/680 |
| 2008/0049291 A1* | 2/2008 | Baek | | G02B 5/10 359/223.1 |
| 2008/0123048 A1* | 5/2008 | Volk | | G02C 7/061 351/159.42 |
| 2010/0135615 A1* | 6/2010 | Ho | | G02B 6/0281 385/33 |
| 2010/0238400 A1* | 9/2010 | Volk | | G02C 7/061 351/159.42 |
| 2012/0177327 A1* | 7/2012 | DeMeritt | | G02B 6/327 385/74 |
| 2013/0148196 A1* | 6/2013 | Arnold | | G02B 3/0087 359/385 |
| 2013/0211515 A1* | 8/2013 | Blum | | A61F 2/1624 623/6.22 |

OTHER PUBLICATIONS

Tate, et al., "Multistage Polymeric Lens Structures Integrated Into Silica Waveguides", Japanese Journal of Applied Physics,, Aug. 1, 2006, vol. 45, No. 8A.

Kundtz et al., Extreme-Angle Broadband Metamaterial Lens, Feb. 2010, vol. 9, Macmillian Publishers Limited.

A. Delâge et al., Monolithically Integrated Asymmetric Graded and Step-Index Couplers for Microphotonic Wavegrides, Jan. 9, 2006, vol. 14, No. 1, Optical Society of America.

Lucas H. Gabrielli et al., Integrated Luneburg Lens Via Ultra-Srong Index Gradient on Silicon, Oct. 10, 2011, Optical Society of America.

Ter-Hoe Loh et al., CMOS Compatible Integration of Si/SiO2 Multilayer GRIN Lens Optical Mode Size Converter to Si Wire Waveguide, Jul. 2, 2012, vol. 20, No. 14, Optical Society of America.

Thomas Fricke-Begemann et al., Direct Light-Coupling to Thin-Film Waveguides Using a Grating-Structured Grin Lens, Sep. 13, 2010, vol. 18, No. 19, Optical Society of America.

* cited by examiner

MULTI-AXIS GRADED-INDEX PHOTONIC COUPLING

TECHNICAL FIELD

The following disclosure generally relates to photonic or optical coupling and, more particularly, to photonic coupling using a graded index lens for focusing along multiple axes.

BACKGROUND

Optically coupling integrated circuits with other components, such as optically conductive fibers or cabling, involves a propagation of light rays through components configured to transition the light rays from an integrated circuit to another component. The transition can cause a loss or degradation of data due to an ineffective propagation of the light rays during the transition. This degradation may cause slower or ineffective data transfers between the integrated circuit and the coupled component.

BRIEF DESCRIPTION OF THE DRAWINGS

Exemplary embodiments of the present invention are described herein with reference to the following drawings.

DESCRIPTION OF EXAMPLE EMBODIMENTS

Overview

In one embodiment, a lens may be provided to optically couple an integrated circuit with another component. The lens may use a material having a variable refractive index to focus rays of light along first axis and a curved surface to focus the rays of light along a second axis.

Example Embodiments

A photonic or optical coupler may focus light in two dimensions, for example along a horizontal and vertical axis of a coupled integrated circuit or chip relative to a facet provided to attach the chip to other components. The focusing along the horizontal dimension may be accomplished by shaping a surface or facet of the chip into a cylindrical or parabolic shape, as seen from a top perspective view. The focusing along the vertical dimension may be accomplished by tailoring a refractive index profile of the lower and upper cladding layers in a coupling. Specifically, the index may be configured to follow an elliptic, spherical, aspherical, or parabolic profile as a function of a vertical position in the coupling.

A lens may be integrated with or added to a chip to provide the coupling. Further, a lens may be constructed as a part of a complementary metal-oxide-semiconductor ("CMOS") or other micro electro-mechanical system ("MEMS") wafer level manufacturing process. For example, layers of the lens material may be added to a chip as layers during the manufacturing process. Also, multiple lenses, each potentially having different configured optical properties, may be formed in a single chip using these or similar techniques.

A lens may be combined with a tapered waveguide to transform propagating light rays from a waveguide-bound optical mode to a fiber based optical mode. The waveguide taper may consist of a narrowing of the waveguide end in a vicinity of the lens, which causes the optical mode within the waveguide to expand in diameter as it nears the lens. A collection of light rays or a light beam emanating from the tapered waveguide may have a large aperture, meaning that the light rays are rapidly diverging in space, and thus would not efficiently couple a chip to a fiber without the aid of a lens. A configuration of the lens may provide that the light rays are transformed to less rapidly diverging light rays, to a collimated beam of light rays, or to converging light rays, thus allowing for an efficient coupling of the chip with a fiber.

Placement and dimensions of a tapered waveguide may be selected to produce a light beam with desired properties such as a mode field diameter or numerical aperture. Further properties of the waveguide taper may be calculated using finite-difference time domain ("FDTD") simulations. Likewise, a lens focal length, size, aperture clarity or color, as well as other lens properties, may be chosen to transform a light beam emanating from the waveguide such that the light beam couples efficiently to an external fiber or other component or external fixture. Particular focal properties of the lens may be configured to focus the light beam in multiple directions using various techniques. Also, the relative placement of a waveguide and a lens may further provide for particular placement of a facet area for coupling. In an embodiment, controlling the optical centerline alignment of the lens and the waveguide may provide for particular placement of a focal area, or coupling facet, of a coupling device. For example, a light beam may propagate along a common optical centerline of a waveguide and lens that are aligned, or in-line, such that the light beam continues to propagate along the common optical centerline to an edge of the coupling providing a coupling facet area. In another example, the waveguide optical centerline and the lens optical centerline may be offset so as to angle a propagation centerline of the light beam to an area of the surface of the coupling that is not along the optical centerline of either the lens or the waveguide.

Combinations of a lens and waveguide taper may be used to couple light beams either into or out of a chip. Particular embodiments may involve specific combinations or configurations of lens and waveguide focal properties that may be customized for varying chip, fixture, fiber, or other component configurations to provide for high coupling efficiency.

Further, lens fabrication as a part of a wafer level controllable process may be controlled at a very high level of precision. Alignment of the lens to an on-chip waveguide may be accurate to within 200 nanometers or better using existing MEMS processing techniques. Further, the optical properties of the lens material may be tuned to specific and particular configurations in a predictable and highly repeatable manner. Also, material gaps between the chip, waveguide, and/or lens may be reduced or eliminated using wafer level techniques for lens fabrication.

Graded-index lenses with multiple axes focal properties may be used to optically couple any photonic components. For example, such lenses may be used in optical transceiver module manufacture as well as short-distance optical interconnects such as active optical cables, board-to-board coupling, rack-to-rack coupling, or any implementation which may involve a chip-to-fiber optical coupling.

In an embodiment, a trench may be etched into a wafer surface, in front of an optical waveguide such as a tapered or nano-tapered waveguide. Multiple layers of dielectric material, such as silicon-oxynitride ("SiON") may be deposited in the trench. A composition of the material (i.e. SiON) for each layer of the deposited material may be controlled so as to form a graded index lens having a variable refractive index along an axis of the lens to control a focal height of a light beam. For example, such controlled chemistry or composition may vary the amounts of oxygen and/or nitrogen in the material. Further, a contoured shape of a surface of the lens may provide for control of a focal width. Such a surface may be generated using a similarly contoured wall of the trench, or by other forming techniques. In this way, the focal length may be controlled by a combination of the contoured surface and gradient index profile of the lens.

Figure 1:
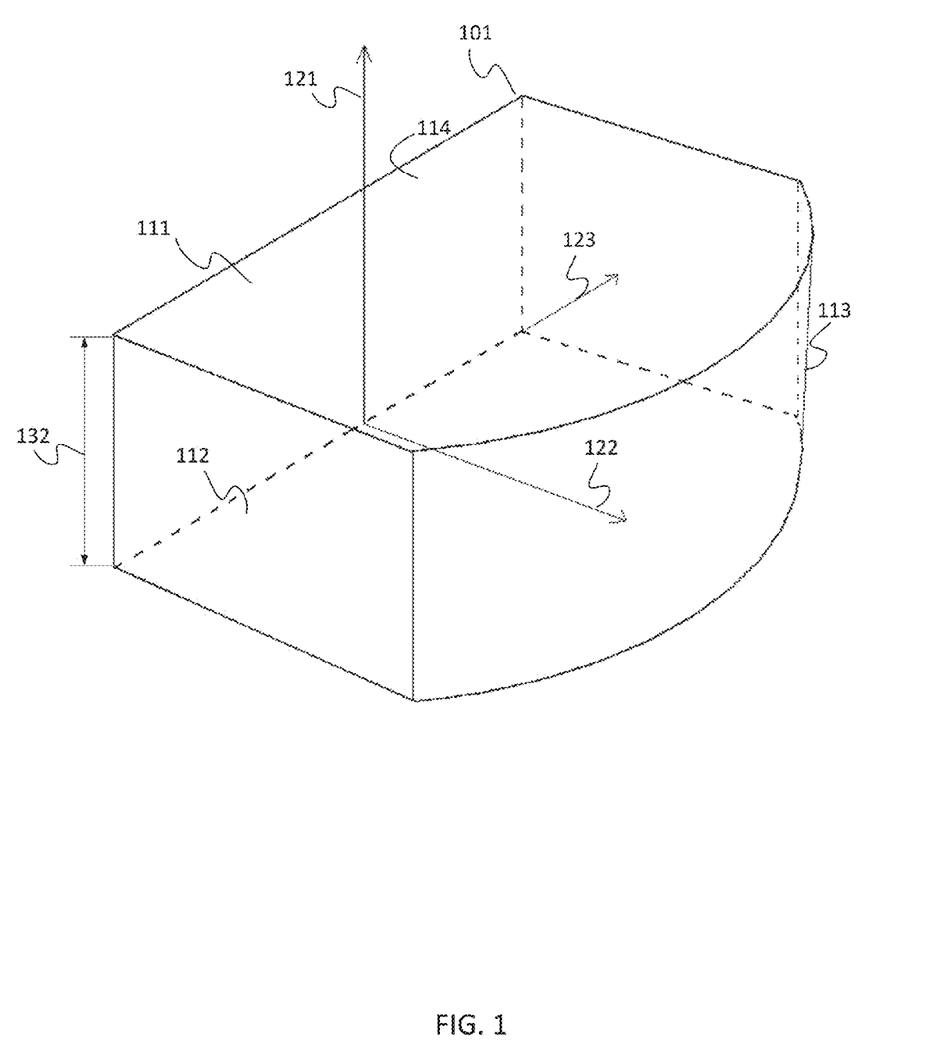
FIG. 1 illustrates an example embodiment of a graded-index lens for focusing along multiple axes.

FIG. 1 illustrates an example graded-index lens 101 for focusing along multiple axes. The lens 101 has two opposing surfaces 111, 112, offset by a distance 132 along a first axis 121. The lens 101 also has a third surface 113 that is curved about the first axis 121. The lens 101 may be oriented such that a collection of rays of light, or a light beam, propagates through the lens 101 along a second axis 122, or the propagation axis, between the opposing surfaces 111, 112 and towards the third surface 113. In an embodiment, the third surface 113 may be perpendicular to planes defined by the first surface 111 and/or the second surface 112 of the opposing surfaces 111, 112.

The lens 101 may be formed from a material having a variable refractive index along the first axis 121. The variable refractive index may be configured to manipulate or focus the rays of light along the first axis 121. In an embodiment, the lens 101 may be composed of a substantially singular material. A substantially singular material may be a material of a same or similar chemical composition, but varying slightly in consistency of composition because of manufacturing errors or impurities. Further, a substantially singular material may involve a same elemental combination, but varying consistency of particular elemental constructs. Further, a substantially similar material may refer to a class of material having similar or same elemental formulation but varying compositions. For example, the lens may be formed from SiON having varied relative amounts of oxygen and nitrogen along the first axis 121. The variation of the relative amounts of oxygen and nitrogen in the material may be configured to provide a parabolic variable refractive index along the first axis. In an embodiment, the variation of the relative amounts of oxygen and nitrogen in the material may be symmetric about a centerline of the lens 101, or another axis.

Also, the curve of the third surface 113 of the lens 101 may be configured to focus the rays of light along a third axis 123. In an embodiment, the first axis 121, the second axis 122, and/or the third axis 123 may be perpendicular. Also, a fourth surface 114 may also, or alternatively, be curved around the first axis 121 to focus the rays of light along the third axis 123. Further, the curves of the third surface 113 and/or the fourth surface 114 may be curved in a concave or convex manner depending on the optical characteristics indicated for various embodiments.

Figure 2A:
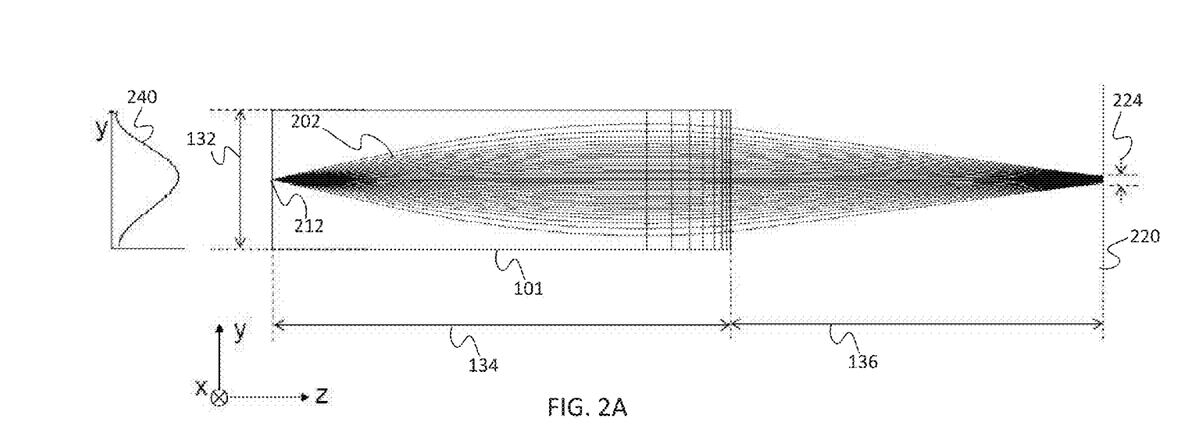
FIGS. 2A-2B illustrate an example of light rays propagating through a graded-index lens.

FIG. 2A illustrates a side view of a propagation of rays of light 202 through a length 134 in a Z axis (e.g., axis 122 of FIG. 1) of a lens 101. The light rays 202 enter the lens 101 at a location 212 having a trajectory in a Y axis. The lens 101 is composed of a material that has a variable refractive index 240 along a height 132 (e.g., axis 121 of FIG. 1) of the lens 101 in the Y axis. The variable refractive index 240 is configured such that the trajectory of the rays of light 202 in the Y axis changes as the rays of light 202 propagate along the length 134 of the lens 101. For example, the variable refractive index 240 may vary as a parabolic function about an optical centerline of the rays of light 202.

Further, the variable refractive index 240 may be configured to provide a focal length 136 such that the rays of light are focused in the Y axis onto an area of focus 224 on a surface 220. An area of focus 224, or focal area, may be an area of a surface which receives a beam of light that has a certain cross sectional area. The beam of light may have been manipulated, for example using the lens 101, such that the rays of light included in the beam are converged, collimated, or diverged into a beam of a desired cross sectional area at the location that the surface intersects with the beam. For example, the area of focus 224 may be the cross sectional area of the rays of light 202 at the distance 136 the surface 220 intersects with the rays of light 202. Further, the area of focus 224 may involve a different height and width dimension, based on characteristics of an implemented embodiment.

In an embodiment, the surface 220 may be an external surface of an integrated circuit board or optical coupling. For a parabolic graded index lens configuration the focal length 136 may be determined using Equation 1.

$$n(r) = n_1\left(1 - 2\Delta\left(\frac{r}{a}\right)^2\right) \quad \text{Equation 1}$$

In Equation 1, $n_1$ is the peak refractive index of the lens, a is half the height 132 of the lens, r is a variable position along a line extending to the focal length 136, n(r) is the refractive index of the material between the lens and the surface 220 at position or length r, and $\Delta$ is the refractive difference defined using Equation 2 where $n_2$ is a refractive index of a second material in a propagation path, such as a cladding material.

$$\Delta = \frac{n_1^2 - n_2^2}{2n_1^2} \quad \text{Equation 2}$$

Further, the sinusoidal path length for a period, P, of light rays manipulated by a parabolic refractive index lens is given by Equation 3.

$$P = \frac{2\pi a}{\sqrt{2\Delta}} \quad \text{Equation 3}$$

Therefore, focal length decreases as P decreases. In an embodiment, the length 136 to the surface is between 0.25 P and 0.5 P.

Figure 2B:
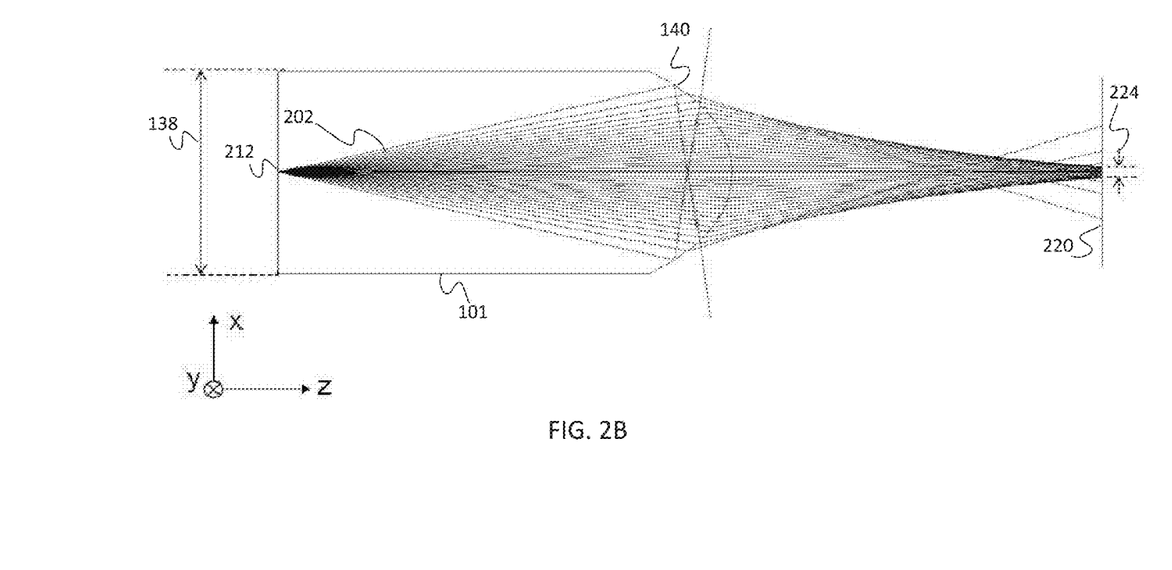

FIG. 2B illustrates a top view of the propagation of light rays 202 through the lens 101 of FIG. 2A. The lens 101 has a curved surface 140 extending along a width 138 of the lens 101 in the X axis. The curved surface 140 is configured such that the rays of light 202 are focused in the X axis by the curved surface 140 of the lens 101 onto the area of focus 224 on the surface 220. The curved surface 140 may involve any radius of curvature, constant or variable along the curves length, so as to focus the rays of light 202 appropriately on the area of focus 224.

In an embodiment involving a light ray coupler, a lens may be oriented relative to a waveguide to appropriately manipulate light rays 202 into an area of focus 224 for coupling. The lens may be oriented relative to the waveguide such that a light beam propagates through both the waveguide and the lens. Specifically, the lens may be oriented and configured to focus a light beam that has propagated through the waveguide. For example, the lens may involve gradient index focal properties along a first axis and focal properties produced by a curve in a surface of the lens along a second axis. Further, multiple lenses and waveguides may be provided in a single component or system for multiple optical outputs and output configurations.

Figure 3A:
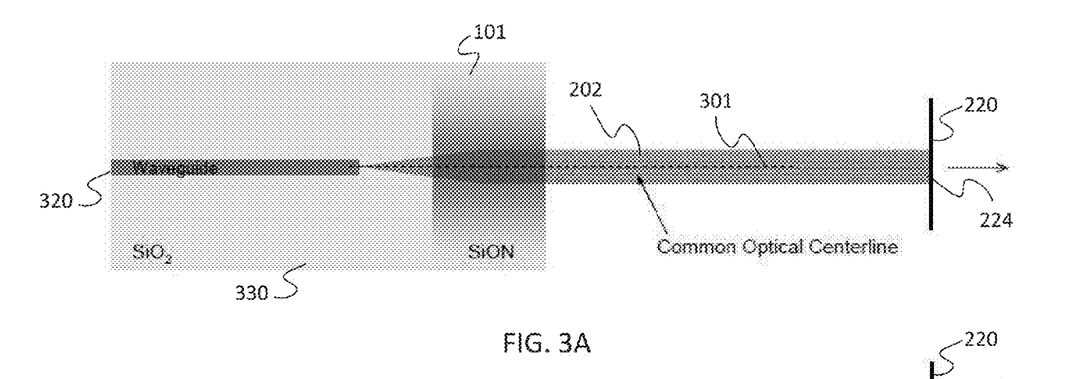
FIGS. 3A-3B illustrate embodiments of graded-index lens coupling alignments.
Figure 3B:
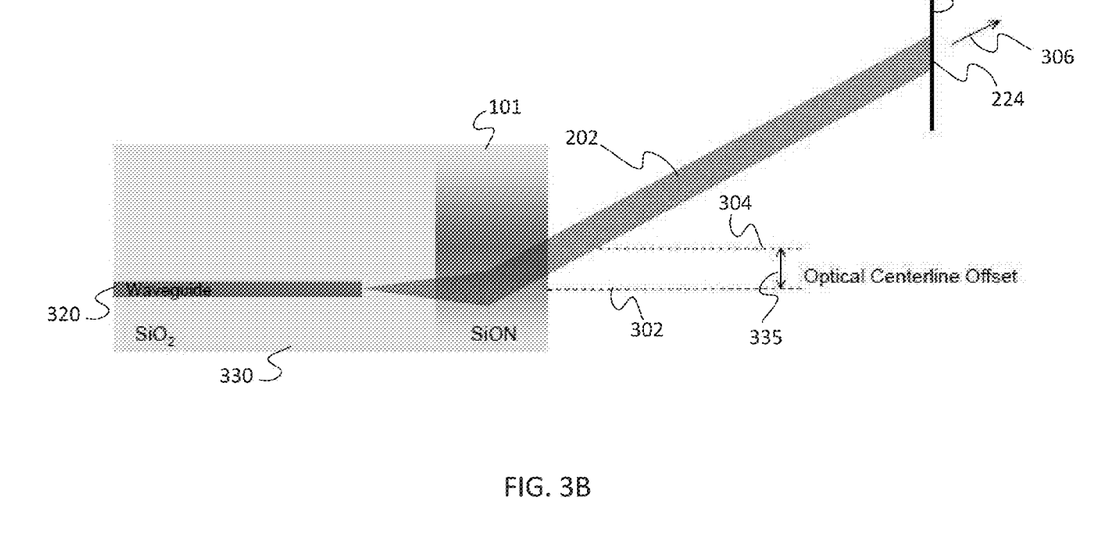

FIG. 3A and FIG. 3B illustrate embodiments of an optical coupling involving a waveguide 320 and a lens 101. The optical coupling may provide a coupling between an integrated circuit and an optically conductive fiber. For example, the optical coupling may involve the propagation of a light beam into the optical coupling at the waveguide 320. The light beam may have originated from an integrated circuit physically connected to the optical coupling at the waveguide 320. The light beam may propagate through the waveguide 320 and the lens 101 to project and manipulate the light beam 202 onto a focal area 224 of an external surface 220 of the optical coupling. The optically conductive fiber may then receive the light beam 202 at the focal area 224 on the external surface 220.

In the embodiment of FIG. 3A, the waveguide 320 is embedded or otherwise inserted in a substance 330, such as silicon dioxide ("Silica"). The waveguide 320 is composed of a material suitable for propagation of light rays, which has a relative refractive index to the embedding material such that the light rays are bound within the waveguide 320. For example, the waveguide may be composed of Silicon. The waveguide 320 is oriented a distance from the lens 101 which is constructed or composed of SiON. Both the waveguide 320 and the lens have an optical centerline, about which light rays propagate through the respective components. In FIG. 3A, the lens 101 and the waveguide 320 have a common optical centerline 301 which provides that the light rays 202 to propagate along the common centerline 301 to the area of focus 224 on a surface 220. FIG. 3B illustrates an embodiment that involve an offset of the waveguide optical centerline 302 and the lens optical centerline 304 such that the rays of light 202 propagate along a different axis 306 to an area of focus 224 on a surface 220. In this embodiment, the location of the area of focus 224 is controlled by the offset 335 of optical centerlines. Any amount of offset may be used, resulting in any angle of deviation. Further, the light beam may travel from the lens 101 to the surface 220 by propagating through an atmosphere, air, or other medium not coupled with the lens.

Figure 4:
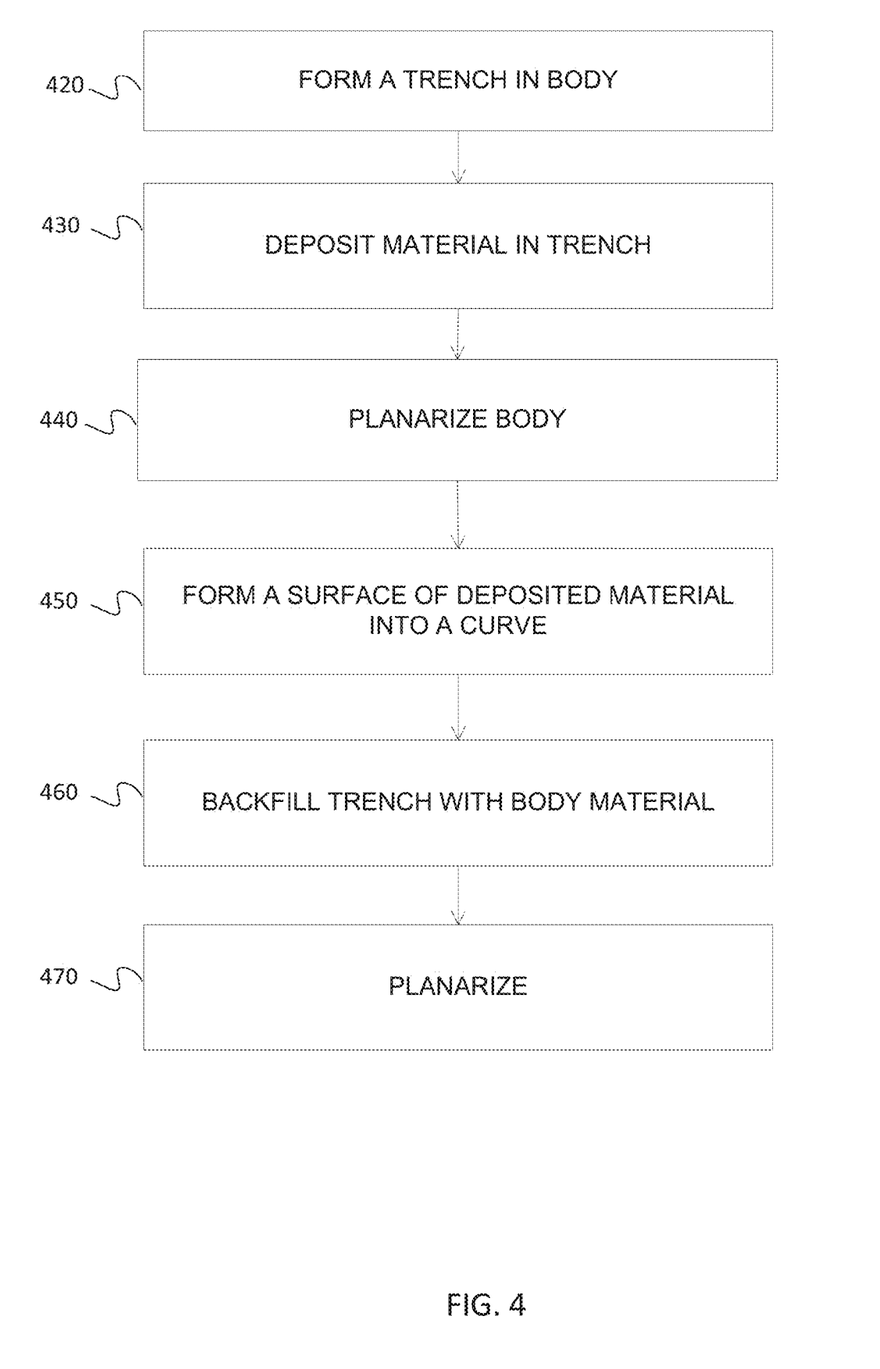
FIG. 4 illustrates an example flowchart of an embodiment for creating a graded-index lens coupling device.

FIG. 4 is an example flowchart for an embodiment involving the formation of a multi-axis graded-index photonic coupling. The acts of the flowchart may be performed in the order shown, or a different order. Additional, different, or fewer acts may be provided. For example, acts 460 and/or 470 are not performed.

Figure 5A:
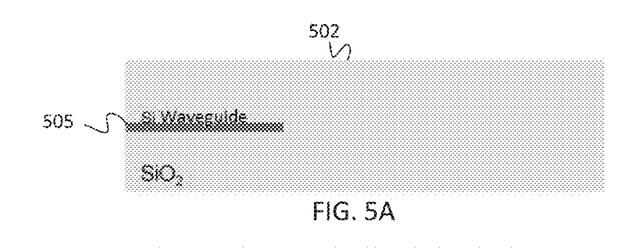
FIGS. 5A-5F illustrate example stages of creating a graded-index coupling apparatus.

In act 420, a trench is formed in a body. The body may be any sort of body or object. In an embodiment, the body may involve an optical coupling device. For example, the body may be a body 502 composed of silica having an embedded silicon waveguide 505, as is illustrated in FIG. 5A.

Figure 5B:
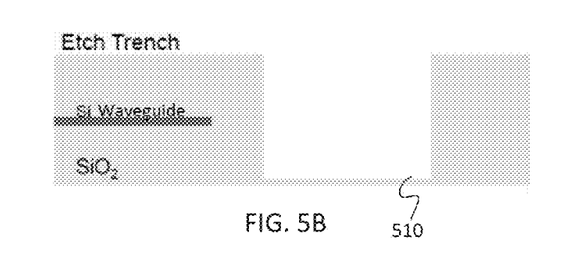

The trench may be formed using any technique. For example, etching techniques, such as wet etching, anisotropic wet etching, and/or plasma etching may be used. The formed trench may be oriented such that the trench crosses a path extending longitudinally from the waveguide, as is illustrated by the trench 510 with reference to FIG. 5B. In an embodiment, the trench may be oriented perpendicular to a length of the waveguide.

Figure 5C:
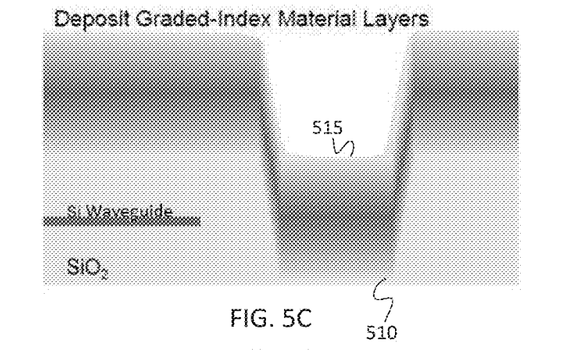

In act 430, material may be deposited in the trench. The material may have a variable refractive index along the depth of the trench such that the material is configured to focus light rays propagating from the waveguide along an axis parallel to the depth of the trench. For example, the trench 510 may be filled with the material 515 as is illustrated with respect to FIG. 5C. In an embodiment, the deposited material may be SiON.

The material may be deposited using any technique. For example, the material may be deposited using a chemical vapor deposition ("CVD") technique. Using a CVD technique, layers of material may be deposited onto the surface of the body by plasma. The composition of the plasma material is determined by a mixture of the precursor gasses that flow into the plasma. In an embodiment involving SiON, the precursor gasses may contain silicon, oxygen, and nitrogen. Other gases may also be used. To form a graded index material, the relative amounts of oxygen and nitrogen may be controlled or varied during the material deposition. For example, the deposition may begin with silicon and oxygen as precursor gases. As more material is deposited, increasing amounts of nitrogen gas and decreasing amounts of oxygen may be added a precursor gases. Once half the desired depth of the deposited material is reached, decreasing amounts of nitrogen gas and increasing amounts of oxygen gas may be added as precursor gases. The varied relative amounts of nitrogen and oxygen through the depth of the deposited material provide for the varying refractive index of the material. Non-symmetrical variation in the levels of gases may be used.

Figure 5D:
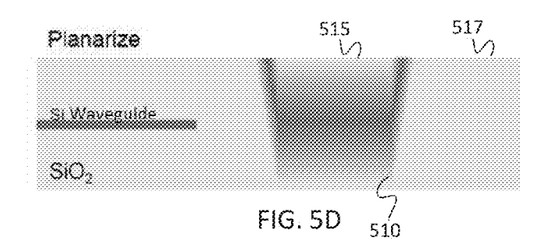

In act 440, the body may be planarized. Planarizing may involve any technique such that the surface is smoothed. For example, with reference to FIG. 5D, planarizing may involve removing material so as to form a flat or planed surface 517 on the body and deposited material 515 in the trench 510 in a same plane. Etching, grinding, sawing or any other technique may be used to smooth the surface.

Figure 5E:
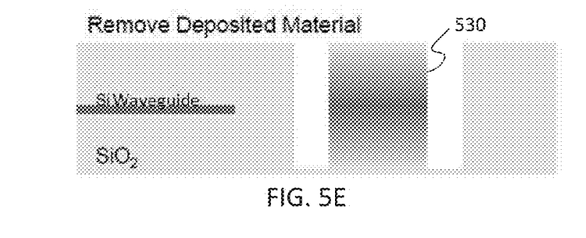

In act 450, a surface of the deposited material is formed into a curve. The curve may be formed by any technique. In an embodiment, as represented in FIG. 5E, deposited material 515 may be removed to form the curved surface 530. Other material such as body material or deposited material on an opposing side of the curve may also be removed to further form or shape the deposited material.

In another embodiment, the trench 510 may be formed with a curved wall. The curved surface of the deposited material may then be formed by the depositing of material into the trench in act 430. As such, the curved trench wall may define or form the deposited material curved surface. Acts 450 and 460 are then not provided as a separate act.

Figure 5F:
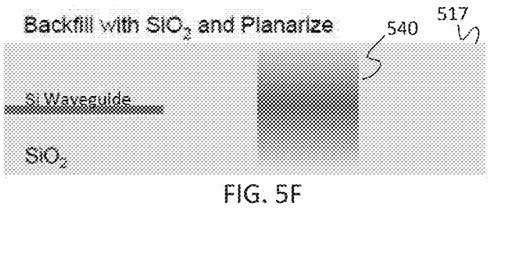

In act 460, material is added to the body. With reference to FIG. 5F, the added material 540 may backfill a void left by the removal of material in act 450 to form the curvature. The material added may be a same material of which the body is composed, or from which the trench 510 was formed. In an embodiment, the trench 510 is formed from the removal of silicon dioxide material of a body and silicon dioxide is added to the body to backfill voids left by the removal of SiON material deposited in the trench.

In act 470, the body may be planarized. The body may be planarized to create a smooth surface in the body by the removal of any excess backfill material.

In an embodiment, the deposited material may be used to form a lens such that light rays propagating through the body may be focused by the deposited material onto a surface of the body. The light rays may be focused onto any surface of the body. For example, the material may be configured such that the light rays are focused onto an end, top, side, or any other surface of the body. In an embodiment, light rays may be focused external to the body. For example, on a surface of a different body.

Figure 6:
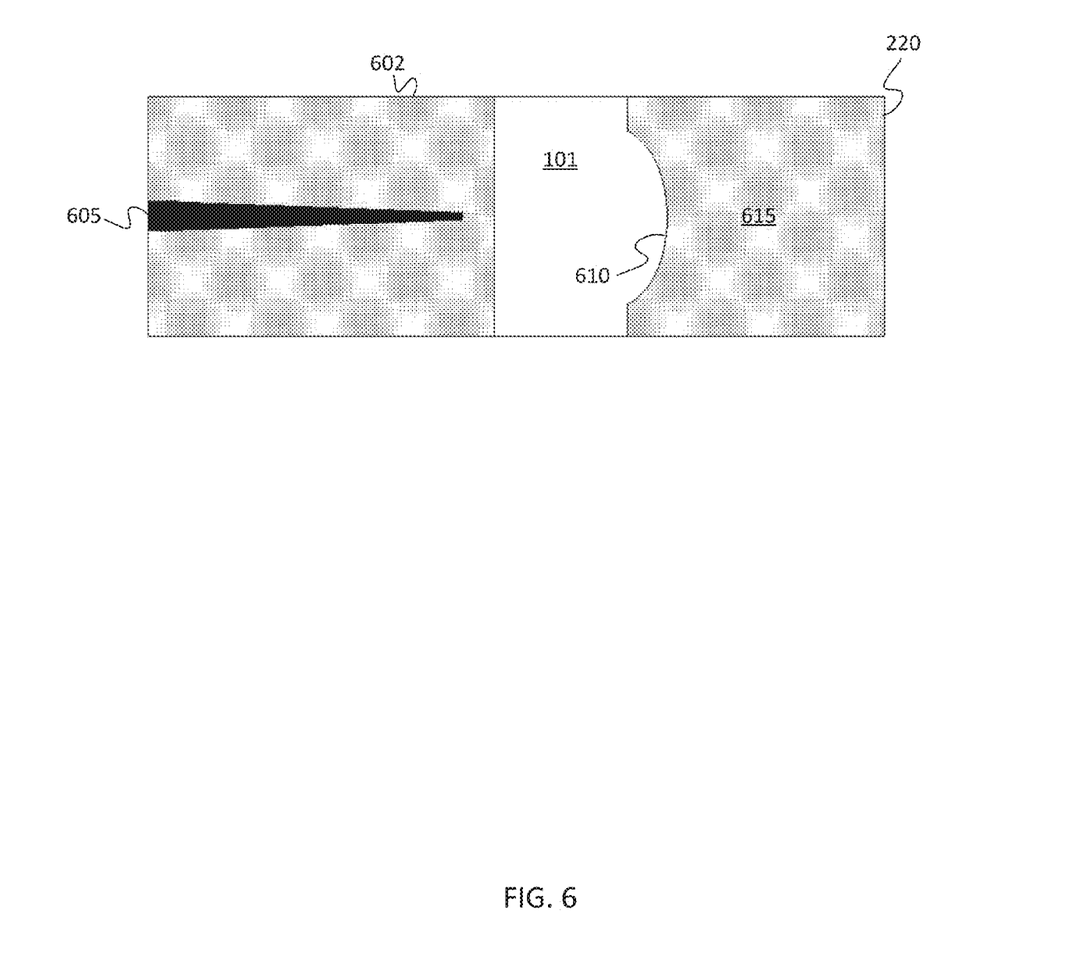
FIG. 6 illustrates an example embodiment of a coupling device implementing a graded-index lens to focus light rays in multiple axes.

FIG. 6 illustrates a top view of an embodiment involving an optical coupling 602 which includes a waveguide 605 that is tapered such that the cross sectional area of the waveguide 605 decreases along a length of the waveguide 605. The optical coupling 602 also includes a lens 101 configured to focus a light beam propagating from the waveguide along two axes onto an external surface 220 of the optical coupling 602. The lens 101 may focus light in a first axis by use of a material in the lens composition which has a variable refractive index along the first axis. The lens 101 may also focus light in a second axis by use of a curved surface 610 of the lens 101. Further, the relative placement, characteristics, and/or configuration of the waveguide 605, lens 101, and the external surface 220 of the coupling may provide for specific optical characteristics of the optical coupling 602. For example, optical centerlines of the waveguide 605 and the lens 101 may be aligned or offset to precisely determine the placement of an area of focus on the external surface 220, or other surfaces of the optical coupling 602. In another example, the relative distance between the lens 101 and the exterior surface 220 may determine a size of a focal area on the external surface 220. In an embodiment, the material 615 between the surface 610 and the external surface 220 may be eliminated or not included in an optical coupling.

The optical coupling 602 may exist as a stand-alone device which may be used in correlation with other devices to optically couple the devices. The optical coupling 602 may also be integrated as a component of a device to provide optical coupling capabilities for the device. For example, the optical coupling 602 may be integrated into an integrated circuit device so as to optically couple the integrated circuit device to other devices. For example, the optical coupling may be embedded or otherwise inserted into cladding material of an integrated circuit such that the external surface of the optical coupling is an external surface of the integrated circuit for coupling with an optical fiber. Further, the optical coupling 602 may be constructed concurrently with the integrated circuit device such as during wafer level manufacture of the integrated circuit device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking may be advantageous. Moreover, the separation of various system components in the embodiments described above should not be understood as requiring such separation in all embodiments One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing detailed description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the detailed description provided herein, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:

1. An apparatus comprising:
   two opposing surfaces, offset by a distance along a first axis;
   a third surface that is curved about the first axis; and
   a material having a variable refractive index along the first axis, wherein the variable refractive index is configured to focus rays of light along the first axis on an area, wherein the material is Silicon-Oxynitride, wherein relative amounts of Oxygen and Nitrogen of the material vary along the first axis, and wherein the third surface is configured to focus the rays of light along a second axis on the area, the second axis perpendicular to the first axis.

2. The apparatus of claim 1, wherein the variable refractive index along the first axis is configured to provide a parabolic variable refractive index along the first axis.

3. The apparatus of claim 2, wherein the apparatus is composed of a substantially singular material.

4. The apparatus of claim 2, further comprising:
a waveguide, wherein an optical centerline of the waveguide and an optical centerline of the first axis are aligned.

5. The apparatus of claim 2, further comprising:
a waveguide, wherein an optical centerline of the waveguide and an optical centerline of the first axis are offset so as to focus the rays of light on an area of the surface not aligned with either centerline.

6. The apparatus of claim 2, further comprising:
a waveguide, wherein the waveguide comprises a taper in a third axis parallel to a direction of the propagation of the rays of light in the waveguide, the taper configured such that a cross sectional area of the waveguide diminishes along the third axis.

7. The apparatus of claim 1, wherein the variation of the relative amounts of oxygen and nitrogen in the material is symmetric about a centerline of the first axis.

8. The apparatus of claim 1, wherein the area is an external surface of an integrated circuit board.

9. The apparatus of claim 1, wherein the area is an external surface of an optical coupling.

10. The apparatus of claim 1, wherein the relative amounts of oxygen and nitrogen in the material is varied by an amount of material deposited as a precursor gas.

11. The apparatus of claim 1, further comprising:
a tapered waveguide, wherein an optical centerline of the tapered waveguide and an optical centerline of the first axis are aligned.

12. The apparatus of claim 1, further comprising:
a tapered waveguide, wherein an optical centerline of the tapered waveguide and an optical centerline of the first axis are offset so as to focus the rays of light on an area of the surface not aligned with either centerline.

13. The apparatus of claim 1, further comprising:
a tapered waveguide, wherein an optical centerline of the waveguide and an optical centerline of the first axis are offset so as to focus the rays of light on an area of the surface not aligned with either centerline.

14. The apparatus of claim 1, wherein the material is deposited as a part of a complementary metal-oxide-semiconductor.

15. The apparatus of claim 1, wherein the material is constructed as part of a micro electro-mechanical system.

* * * * *